June 5, 1962  F. J. DIXON  3,037,484
REMOTELY CONTROLLED ACTUATOR
Filed Nov. 24, 1958  3 Sheets-Sheet 1

INVENTOR:
Fredric J. Dixon

Attorneys

June 5, 1962

F. J. DIXON 3,037,484

REMOTELY CONTROLLED ACTUATOR

Filed Nov. 24, 1958

INVENTOR:
Fredric J. Dixon

By Smyth & Roston
Attorneys

June 5, 1962  F. J. DIXON  3,037,484
REMOTELY CONTROLLED ACTUATOR
Filed Nov. 24, 1958  3 Sheets-Sheet 3

INVENTOR
Fredric J. Dixon

Attorneys

United States Patent Office 3,037,484
Patented June 5, 1962

3,037,484
REMOTELY CONTROLLED ACTUATOR
Fredric J. Dixon, Pacoima, Calif., assignor, by mesne assignments, to Telecomputing Corporation, a corporation of California
Filed Nov. 24, 1958, Ser. No. 775,841
7 Claims. (Cl. 121—38)

This invention relates to a remotely controlled actuator for shifting a remote member through a range of positions.

While the invention is widely applicable for its purpose, it has special utility for high temperature installations. The initial embodiment of the invention is on an aircraft and actuates a butterfly valve in an ambient temperature of 400°–500° F. for controlling the flow of a heated gaseous fluid for de-icing. This initial embodiment of the invention selected for the present disclosure will provide adequate guidance for those skilled in the art who may have occasion to apply the same principles to other specific purposes.

A problem of primary consideration in this practice of the invention is, of course, to construct a remote actuator capable of withstanding a relatively high ambient temperature. A motor of conventional inexpensive construction will not stand up and special motors for high temperature installations are too expensive for the purpose. In addition, a serious drawback for aircraft use is that a motor with the necessary associated gearing is relatively heavy.

The invention solves this problem by using a remote fluid-actuating means under the control of remote solenoid valves. Solenoid valves constructed for high temperature usage are reliable and, in comparison with motors, are simple, light in weight and inexpensive. In the preferred practice of the invention, the actuating fluid is a gaseous fluid and two gaseous fluid compartments are separated by an actuating wall means that responds to pressure differentials between the two compartments.

A second problem to which the invention is directed is to provide a two-position remote actuator that is "fail-safe" in the sense that the remote actuator tends to remain at either of the two opposite positions to which it may be moved. For this purpose, the preferred practice of the invention provides spring means to hold the remote member yieldingly at either of its two limit positions. The spring means is under maximum stress at the midpoint in the range of movement of the remote member so that whenever the remote member is shifted over more than half of its range in either direction, it completes the movement with a snap action.

A third problem is to minimize leakage of the pressurized actuating fluid and to simplify the problem of preventing such leakage. In this regard, a feature of the invention is the concept of employing an actuating piston in a pneumatic power cylinder that is integral with the section of the gaseous conduit in which the butterfly valve is located and is sealed except for its communication with the interior of the gaseous conduit along the operating stem of the butterfly valve. The butterfly valve has a peripheral seal in a plane that is inclined from the axis of rotation of the butterfly valve so that the operating end of the valve stem is on one side of the sealing plane. With the butterfly valve mounted on the valve stem in a fluid-tight manner to prevent leakage through the butterfly valve along its axis of rotation, this arrangement makes it unnecessary to provide a fluid-tight seal around the valve stem. In fact, apart from the solenoid valves themselves, no dynamic seals are required, i.e., no seals around moving parts.

A further feature of the invention is the provision of limit switches to de-energize the valve-actuating solenoids when the remote member reaches its two opposite positions in response to energization of the solenoids. The spring means is relied upon primarily to hold the remote member at whichever of its two opposite positions to which it may be moved, but if the spring means fails, the limit switch arrangement will serve the same purpose. Any undesired movement of the remote member from either of its two opposite positions results in closing of the corresponding limit switch to energize the corresponding solenoid to restore the remote member.

The invention further provides means for remote indication of the position of the remote member. A feature of the preferred practice of the invention is the use of the two limit switches to control signal circuits for this purpose.

The features and advantages of the invention may be understood from the following detailed description taken with the accompanying drawings.

In the drawings, which are to be regarded as merely illustrative:

*General Arrangement*

Figure 1:
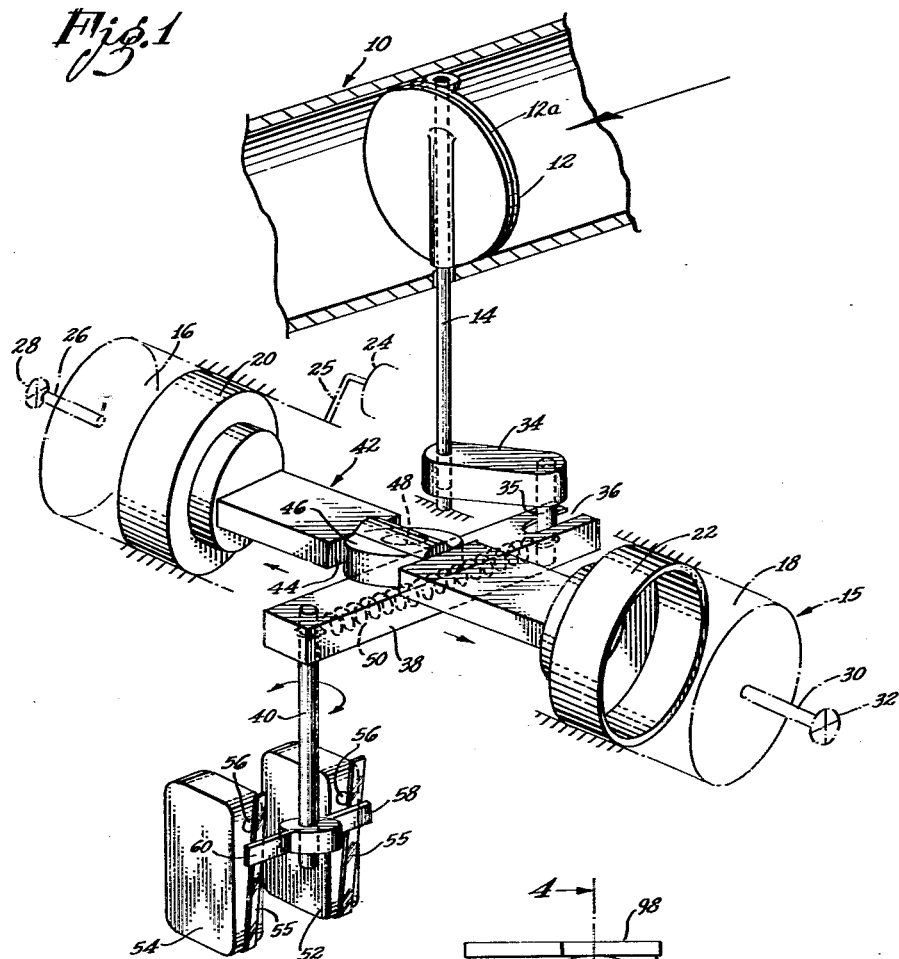
FIG. 1 is a simplified diagrammatic perspective view illustrating the principles underlying the invention.

FIG. 1 shows a conduit 10 which is supplied with a heated gaseous fluid under pressure for flow in the direction of the arrow for de-icing and shows a butterfly valve 12 on an operating stem 14 for controlling the flow through the conduit. The remotely controlled actuator for the valve stem 14 comprises a power cylinder 15 in which is mounted a movable actuating wall means in the form of a dual piston which divides the cylinder member into a first fluid compartment 16 and a second fluid compartment 18. The dual piston shifts in opposite directions in response to opposite pressure differentials between the two fluid compartments. The dual piston comprises two spaced rigidly interconnected piston elements 20 and 22. While hydraulic fluid may be employed in some practices of the invention, gaseous fluid is employed in this instance and, for this purpose, the two fluid compartments 16 and 18 may, if desired, be connected to the same high pressure source that feeds the conduit 10.

The high pressure source may be connected to the two fluid compartments 16 and 18 in any suitable manner. In the arrangement shown diagrammatically in FIG. 1, a source 24 of pressurized gaseous fluid is connected by a supply passage means 25 to the central space in the power cylinder 15 between the two piston elements 20 and 22 and the two piston elements fit the cylinder with sufficient looseness to permit flow at a restricted rate of the gaseous fluid from the central space of the cylinder to the two opposite fluid compartments 16 and 18. The first fluid compartment 16 has a bleeder port 26 controlled by a normally closed first solenoid valve 28 and, in like manner, the second fluid compartment 18 has a bleeder port 30 controlled by a normally closed second solenoid valve 32. Each of the two bleeder ports and the corresponding solenoid valves has a higher flow capacity than the annular clearance around the two piston elements 20 and 22.

It is apparent that with both of the solenoid valves 28 and 32 closed, the pressure in the two fluid compartments 16 and 18 will be equalized by virtue of the restricted freedom for fluid flow past the two piston elements 20 and 22. If either of the two solenoid valves is opened by remote control, however, the pressure in the corresponding fluid compartment falls and thereby causes the dual piston to shift in the corresponding direction to cause corresponding operation of the butterfly valve 12.

The dual piston may be operatively connected with the butterfly valve 12 in any suitable manner. The connecting linkage shown diagrammatically in FIG. 1 is employed in the present embodiment of the invention. The valve stem 14 is operated by a crank arm 34 having a crank pin 35 that extends slidingly into a longitudinal slot 36 in the outer swinging end of a pivoted actuating member or lever 38. The actuating lever 38 is fixedly connected to a pivot member 40 to swing about the axis of the pivot member, the pivot member being suitably journaled and supported.

The pivoted actuating member 38 is operated by reciprocation of the dual piston in the power cylinder 15. For this purpose, the two piston elements 20 and 22 are rigidly interconnected by suitable structure, generally designated 42, which provides a wide transverse slot 44. What may be termed a follower roller 46 spans the wide slot 44 for movement along the slot and is rotatably mounted on a stud 48 that projects laterally from the actuating lever 38. It is apparent that reciprocation of the dual piston between its opposite positions causes corresponding oscillation of the actuating lever 38 with the follower roller 46 shifting along the wide slot 44.

While the described linkage may be used without additional spring means to maintain the butterfly valve at whichever position it may be placed, the present embodiment of the invention further provides such a spring means. For this purpose, FIG. 1 shows diagrammatically a coil spring 50 acting in tension with one end of the spring connected to the pivot member 40 and with the other end connected to the crank pin 35. With the crank 34 shorter than the actuating lever 38 and with the axis of rotation of the crank so positioned that the crank and actuating lever are parallel at substantially the midpoint in the range of oscillation of the actuating lever, it is apparent that the crank pin 35 will be at its outermost limit position in the slot 36 at the midpoint in the range. Thus the described arrangement provides an "over center" action in that the spring 50 tends to urge the crank pin 35 towards the inner end of the slot 36 so that the spring resists initial movement of the actuating lever out of either of its limit positions. When the actuating lever is forced more than half way between its limit positions, the spring tends to assist the continued movement of the acuating lever with a snap action.

The present embodiment of the invention is further characterized by the provision of a first limit switch 52 and a second limit switch 54 to de-energize the corresponding solenoid valves 28 and 32, respectively, when the butterfly valve is moved to the corresponding positions. It is further contemplated that means will be provided for remote indication of the position of the butterfly valve 12. A feature of the invention is the employment of two signal circuits for this purpose and the employment of double-throw switches for the limit switches 52 and 54, each limit switch alternately closing a solenoid circuit and a signal circuit.

As indicated in FIG. 1, each of the two double-throw limit switches 52 and 54 may be provided with an outer leaf spring 55 which may be flexed inward to actuate an operating plunger 56 of the switch. FIG. 1 also shows how a pair of rocker arms 58 and 60 may be mounted on the pivot member 40 to operate the two limit switches 52 and 54 in response to oscillation of the actuating member 38.

Figure 8:
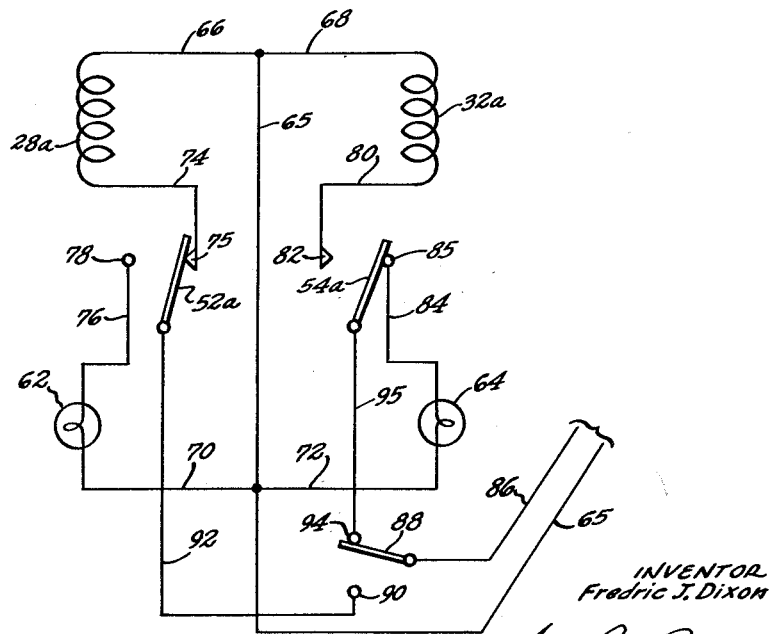
FIG. 8 is a wiring diagram of the actuating circuits and signal circuits used in the preferred practice of the invention.

FIG. 8 is a wiring diagram of circuitry that may be employed in this first embodiment of the invention. In FIG. 8, the first and second solenoid valves 28 and 32 are represented by solenoid coils 28a and 32a, respectively, and the first and second double-throw limit switches 52 and 54 are represented by switch arms 52a and 54a, respectively. The signal means for remotely indicating the two positions of the butterfly valve 12 comprises a first indicating lamp 62 and a second indicating lamp 64. One lead 65 from a suitable E.M.F. source is connected by wires 66 and 68 to the two solenoid coils 28a and 32a, respectively, and is connected by wires 70 and 72 to the two indicating lamps 62 and 64. The second side of the solenoid coil 28a is connected by a wire 74 to one contact 75 of the limit switch 52 and the second side of the indicating lamp 62 is connected by a wire 76 to the second contact 78 of the same limit switch. In like manner, the second side of the solenoid coil 32a is connected by a wire 80 with one contact 82 of the second limit switch 54 and a wire 84 connects the second side of the indicating lamp 64 to the second contact 85 of the limit switch. The second lead 86 from the E.M.F. source is connected to a master switch represented by a switch arm 88. The master switch arm 88 is movable between one contact 90 that is connected to the limit switch arm 52a by a wire 92 and a second contact 94 that is connected by a wire 95 with the limit switch arm 54a.

*Operation*

FIG. 1 shows the butterfly valve 12 in closed position with the dual piston at its rightward position in the power cylinder 15, the rightward fluid chamber 18 being contracted and the leftward fluid chamber 16 being expanded. Both of the solenoid valves 28 and 32 are closed and, therefore, the pressures in the two fluid chambers 16 and 18 are equalized. This rightward position of the dual piston places the actuating lever 38 and the crank 34 in their rightward positions, the rocker arm 60 depressing the plunger 56 of the limit switch 54.

As shown in FIG. 8, the arm 88 of the master switch is positioned at contact 94 and since the limit switch 54 is operated by the rightward position of the dual piston, the limit switch arm 54a is against the contact 85 to complete the following circuit through the indicating lamp 64: lead 86, arm 88 of the master switch, wire 95, arm 54a of the limit switch, wire 84 to one side of the indicating lamp 64 and wire 72 from the second side of the indicating lamp to the second lead 65. The second indicating lamp 62 is de-energized because the switch arm 52a of the limit switch 52 is positioned away from the contact 78. The solenoid coil 32a is de-energized because the limit switch 54 is open with the switch arm 54a away from the contact 82. The other solenoid coil 28a is de-energized because the arm 88 of the master switch is positioned away from the contact 90.

To open the butterfly valve 12, the master switch arm 88 is swung to its alternate position against contact 90 to close the following circuit: lead 86, arm 88 of the master switch, wire 92, limit switch arm 52a, wire 74 to one side of the solenoid coil 28a and wire 66 from the other side of the solenoid coil to the second lead 65. This shift of the master switch arm 88 de-energizes the indicating lamp 64.

Energization of the solenoid coil 28a operates the solenoid valve 28 to open the port 26 to release gaseous fluid from the expanded fluid chamber 16. The opening of the port 26 causes the pressure in the fluid chamber 16 to drop because the flow capacity of the port 26 is greater than the flow capacity of the leakage space around the left piston element 20. The consequent preponderance of pressure in the fluid chamber 18 relative to the pressure in the fluid chamber 16 causes the dual piston to shift to the left as viewed in FIG. 1. With the leftward movement of the dual piston, the actuating lever 38 is swung to the left by the action of the follower roller 46 in the transverse slot 44 of the piston structure 42. This leftward swing of the actuating lever 38 is initially opposed by the stress of the spring 50, but when the actuating lever moves past center, the force exerted by the spring assists the leftward movement. The leftward movement of the actuating lever 38 swings the crank 34 to the left to open the butterfly valve 12.

The initial movement of the actuating lever 38 from its rightward position permits the limit switch arm 54a to return to its normal position with consequent de-energization of the indicating lamp 64. As the dual piston reaches its leftward limit, the rotation of the pivot member 40 by the actuating lever 38 moves the rocker arm 58 against the limit switch 52 for actuation thereof and the consequent shift of the limit switch arm 52a against the contact 78 closes the signal circuit to energize the indicating lamp 62. At the same time, the movement of the limit switch arm 52a away from the contact 75 de-energizes the solenoid coil 28 to close the port 26.

It is apparent that the spring 50 tends to hold the actuating lever 38 in either of the two limit positions at which it may be placed by the dual piston. It is also apparent that if the spring fails, the dual piston would remain at whichever of its two positions it may be placed since any movement of the piston out of this position would release the corresponding limit switch to cause energization of the corresponding solenoid valve to restore the dual piston.

*Structural Details, FIGS. 2 to 7*

Figure 2:
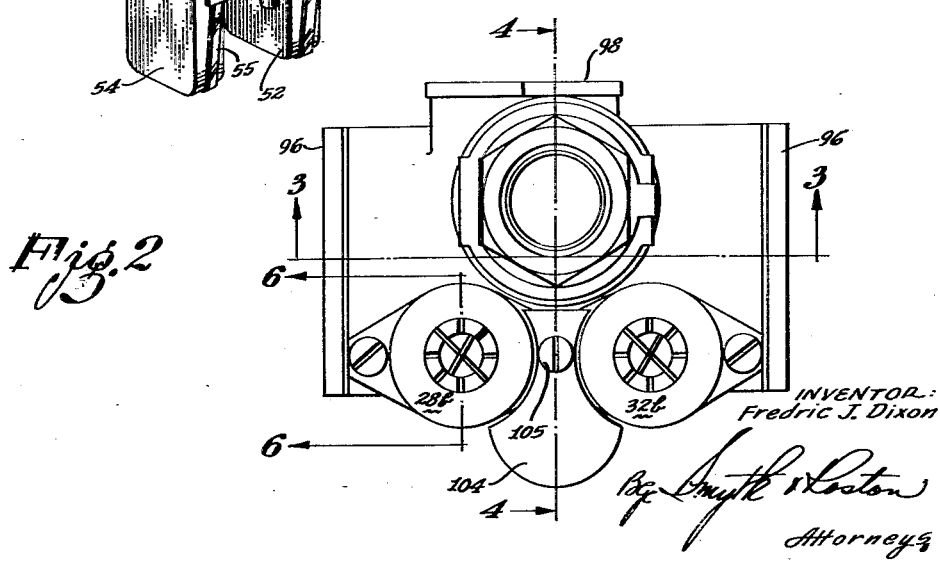
FIG. 2 is a plan view of the initial embodiment of the invention for operating a butterfly valve for remote control of a hot gaseous fluid.
Figure 3A:
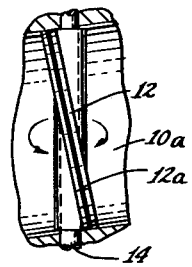
FIG. 3a is an elevational view of the butterfly valve as seen edgewise.
Figure 3:
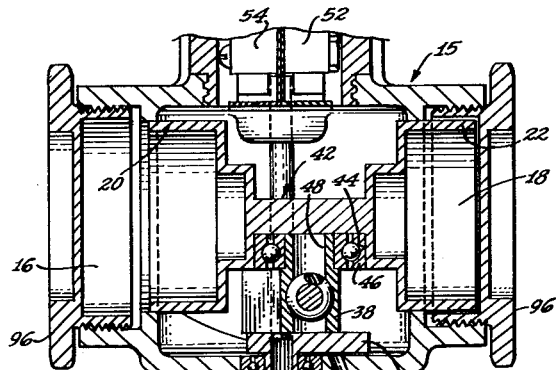
FIG. 3 is a sectional view of the remote actuator and the butterfly valve controlled thereby, the section being taken along the line 3—3 of FIG. 2.
Figure 4:
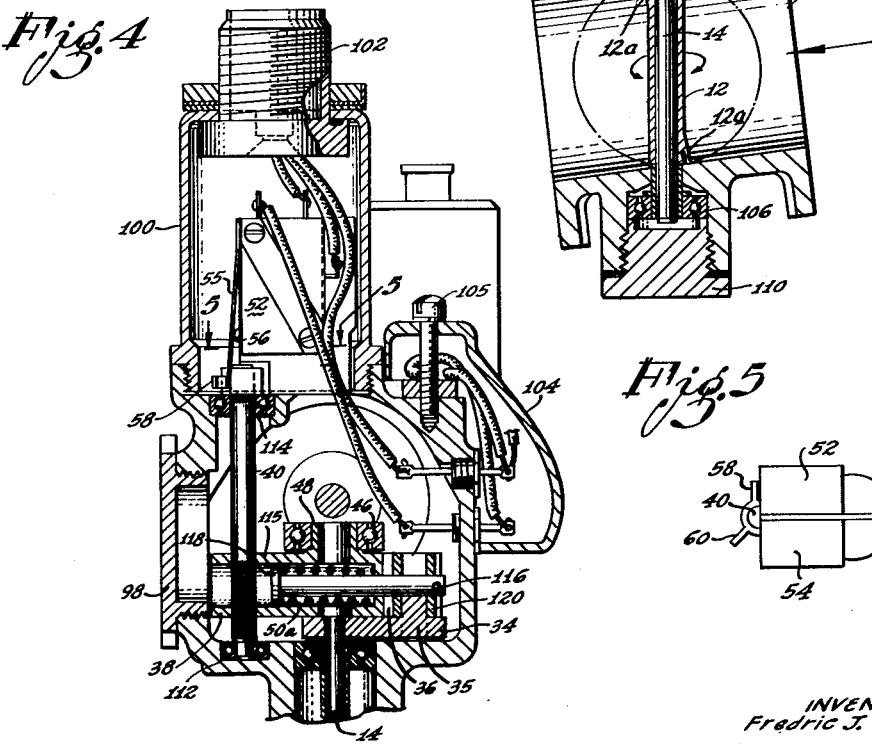
FIG. 4 is a fragmentary section taken along the line 4—4 of FIG. 2.
Figure 5:
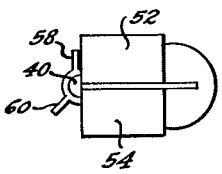
FIG. 5 is a bottom view of a pair of limit switches and cam means for operating the limit switches in response to opening and closing of the butterfly valve.

As shown in FIG. 3, the casing structure for the present embodiment of the remote actuator includes a section 10a of the conduit controlled by the butterfly valve 12, the previously mentioned power cylinder 15 being integral with the conduit section. The two ends of the power cylinder 15 are closed by plugs 96 and a side opening of the power cylinder shown in FIGS. 2 and 4 is closed by a third plug 98. Mounted on the upper side of the power cylinder by screw threads is a switch housing 100 for the two limit switches 52 and 54. The switch housing 100 opens into the interior of the power cylinder and is provided with an electrical receptacle fitting 102 for connecting the remote actuator into the control circuitry. Also mounted on the upper side of the power cylinder 15 are two solenoids 28b and 32b, as shown in FIG. 2, for the two corresponding solenoid valves 28 and 32. In addition, this particular embodiment of the invention includes an external shell 104 which is mounted on the outside of the casing structure by a screw 105 to protect the wiring associated with the two adjacent solenoids. The butterfly valve is provided with a peripheral sealing ring 12a in a plane that is inclined relative to the valve stem 14 and intersects the valve stem centrally of the butterfly valve. Thus, when the butterfly valve is in its closed position shown in FIGS. 3 and 3a, the peripheral sealing ring 12a cuts off the upper or operating portion of the valve stem from the lower portion of the valve stem. The body of the butterfly valve 12 is mounted on the valve stem in a fluid-tight manner to prevent leakage through the butterfly valve along the valve stem.

The valve stem 14 for the butterfly valve 12 is journaled by a lower bearing 106 and an upper pair of bearings 108, the lower bearing 106 being sealed off from the atmosphere by a plug 110. The upper end of the valve stem 14 is splined, as indicated, for engagement by the crank 34. As shown in FIG. 4, the pivot member 40, to which the actuating lever 38 is keyed, is journaled by a lower bearing 112 and an upper bearing 114. The previously mentioned rocker arms 58 and 60 for operating the limit switches 52 and 54 are mounted on the upper end of the pivot member 40 in the switch housing 100.

As shown in FIG. 4, the actuating lever 38 has a longitudinal tubular portion 115 in which is mounted a plunger 116 having a head 118. A compression spring 50a corresponding to the previously diagrammatically shown tension spring 50 is mounted in the tubular portion 115 in compression against the plunger head 118. The outer end of the plunger 116 is connected to a short sleeve 120 that is mounted for reciprocation in the previously mentioned slot 36 of the actuating lever. The previously mentioned crank pin 35 is journaled in the sleeve 120. Thus, in effect, the crank pin 35 is slidingly mounted in the slot 36 and is urged by the compression spring 50a towards the inner end of the slot.

Integral with the tubular portion 115 of the actuating arm 38 is the previously mentioned stud 48 on which the previously mentioned follower roller 46 is mounted, the stud being tubular, as shown. FIG. 3 shows how the follower roller 46 is confined by the relatively wide slot 44 that is formed by the previously mentioned structure 42 interconnecting the two piston elements 20 and 22.

Pressurized gaseous fluid is supplied to the power cylinder 15 from the high pressure side of the butterfly valve 12 by a bore 25a shown in FIG. 3. The bore 25a corresponds to the previously mentioned supply passage means 25 shown diagrammatically in FIG. 1 and, of course, the high pressure source shown diagrammatically at 24 in FIG. 1 is the high pressure fluid source on the upstream side of the butterfly valve 12.

Figure 6:
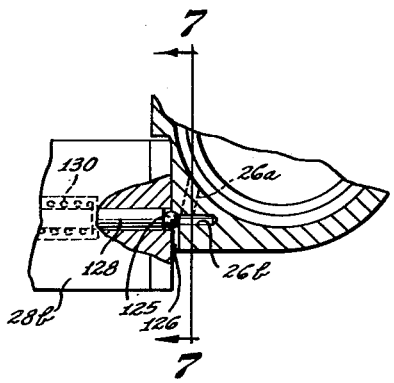
FIG. 6 is a fragmentary section along the line 6—6 of FIG. 2 showing the construction of one of the solenoid valves.
Figure 7:
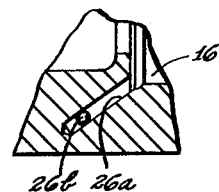
FIG. 7 is a fragmentary section along the line 7—7 of FIG. 6 showing the fluid passage for connecting a solenoid valve with the corresponding fluid chamber.

The two solenoid valves 28 and 32 may be of any suitable construction and may be connected to the pressure chambers 16 and 18, respectively, in any suitable manner. FIGS. 6 and 7 show by way of example the construction of the solenoid valve 28. As shown in FIGS. 6 and 7, the previously mentioned port 26 for releasing pressurized fluid from the fluid chamber 16 to the atmosphere through the solenoid valve 26b may comprise a bore 26a communicating with the fluid chamber and a second intersecting bore 26b which forms a valve seat for a small valve ball 125. When the valve ball 125 is unseated, the pressurized gaseous fluid escapes to the atmosphere through a discharge port 126 shown in FIG. 6. Normally the valve ball 125 is held in its seated position by the armature 128 of the solenoid 28b under the pressure of a coil spring 130. When the solenoid is energized, the armature 128 is retracted against the opposition of the coil spring 130 to place the fluid chamber 16 in communication with the atmosphere.

My description of the initial embodiment of the invention in specific detail will suggest various changes, substitutions and other departures from my disclosure within the spirit and scope of the appended claims.

I claim:
1. In a remotely controlled actuator for shifting a remote member between two opposite positions, the combination of: a pivoted actuating member operatively and positively connected with said remote member and swingable between two limit positions to move said remote member simultaneously and synchronously between its two opposite position; spring means operatively connected with said pivoted actuating member for minimum stressing thereby at the two limit positions thereof and maximum stressing thereby at a central position thereof whereby the spring means yieldingly resists initial movement of the actuating member out of either of its two limit positions; a fluid chamber; movable actuating wall means operatively connected with said pivoted actuating member and separating said chamber into two compartments whereby the wall means shifts between two opposite positions to swing said actuating member between its two limit positions in response to opposite differentials of pressure between the two compartments; means placing each of said two compartments in communication with a source of pressurized fluid to equalize the pressure in the two compartments, said compartments having bleeder ports; and remotely controlled valves normally closing said bleeder ports to cause equalization of pressure between the two compartments, the flow capacity of each of said bleeder ports being greater than the flow capacity of the corresponding means that places the corresponding compartment in communication with said source whereby the two valves may be opened selectively to cause lowering of pressure in the two compartments selectively with consequent shift of said actuating wall means.

2. In a remotely controlled actuator for shifting a remote member between two opposite positions, the combination of: a first fluid compartment and a second fluid compartment; movable actuating wall means operatively connected with said remote member for actuation thereof, said actuating wall means separating said compartments and being responsive to pressure differentials therebetween to shift between two limit positions corresponding to said two opposite positions of the remote member; a single pivotal spring effective to yieldingly hold said remote member at its two opposite positions; a source of pressurized fluid to create fluid pressure in said two compartments; means including a first solenoid valve and a second solenoid valve connected with said first and second compartments respectively for selective actuation to cause preponderant pressure in the two compartments selectively for consequent shift of said actuating wall means between its two limit positions; a first solenoid circuit and a second solenoid circuit to energize said two solenoid valves respectively for actuation thereof; master switch means to close said two solenoid circuits selectively; and two limit switches in said two solenoid circuits respectively, said limit switches being biased to seek closed positions and being responsive to movement of said remote member to its opposite positions respectively to open to de-energize said solenoid valves respectively.

3. A combination as set forth in claim 2 which includes: two signal circuits for indication of the position of said remote member; and two switches in said signal circuits respectively responsive to the movements of said remote member to its opposite positions respectively.

4. In a remotely controlled actuator for shifting a remote member between two opposite positions, the combination of: a first fluid compartment and a second fluid compartment; movable actuating wall means operatively connected with said remote member for actuation thereof, said actuating wall means separating said compartments and being responsive to pressure differentials therebetween to shift between two limit positions corresponding to said two opposite positions of the remote member; spring means effective to yieldingly hold said remote member at its two opposite positions; a source of pressurized fluid to create fluid pressure in said two compartments; means including a first solenoid valve and a second solenoid valve connected with said first and second compartments respectively for selective actuation to cause preponderant pressure in the two compartments selectively for consequent shift of said actuating wall means between its two limit positions; a first solenoid circuit and a second solenoid circuit to energize said two solenoid valves respectively for actuation thereof; master switch means to close said two circuits selectively; a first signal circuit and a second signal circuit to indicate the placing of said remote member at said two opposite positions respectively; and two double-throw limit switches responsive to movement of said remote member to its two opposite positions respectively, one of said limit switches being responsive to movement of said remote member to one of its two limit positions to open said first solenoid circuit and close said first signal circuit, the other of said two limit switches being responsive to movement by said remote member to the other of its two limit positions to open said second solenoid circuit and close said second signal circuit.

5. In a remotely controlled actuator for shifting a remote member between two opposite positions, the combination of: a pivoted actuating member operatively and positively connected with said remote member and swingable between two limit positions to move said remote member simultaneously and synchronously between its two opposite positions, said pivoted actuating member having a longitudinal slot therein; a crank operatively connected to said remote member and slidingly engaging said slot, said crank and actuating member being positioned relative to each other for the crank to shift in one direction relative to the slot and back again when the pivoted actuating member swings between its two limit positions; spring means connected to said crank to urge the crank in said one direction to yieldingly resist movement of the pivoted actuating member out of either of its two limit positions; a first fluid compartment and a second fluid compartment; movable actuating wall means operatively connected with said remote member for actuation thereof, said actuating wall means separating said compartments and being responsive to pressure differentials therebetween to shift between two limit positions corresponding to said opposite positions; a source of pressurized fluid to create fluid pressure in said two compartments; and means including a first remotely controlled valve and a second remotely controlled valve connected with said first and second compartments respectively for selective actuation to cause preponderant pressure in the two compartments selectively for consequent shift of said actuating wall means between its two limit positions.

6. A combination as set forth in claim 5 in which said remote valves are electrically actuated and which includes: two circuits to actuate said valves respectively; two limit switches in said two circuits respectively, said limit switches being biased to seek their closed postions; and means responsive to movement of said pivoted actuating member to its opposite limit positions to open said two limit switches respectively.

7. In a remotely controlled actuator for shifting a remote member between two opposite positions, the combination of: a pivoted actuating member operatively connected with said remote member and swingable between two limit positions to move said remote member between its two opposite positions; said pivoted member having a longitudinal slot near its swinging end; a crank in sliding engagement with said shot and connected with said remote member for actuation thereof, said crank being shorter than said pivoted member and having its pivot point located to make the crank substantially parallel with the pivoted member at substantially the middle of the range of swinging movement of the pivoted member; spring means operatively connected with the swinging end of said crank to urge said end toward the inner end of said slot thereby to yieldingly hold said remote member at either of its two opposite positions; a first fluid compartment and a second fluid compartment in restricted communication with a common source of pressurized fluid to be maintained normally under balanced fluid pressures; movable actuating wall means operatively connected with said pivoted member for actuation thereof, said actuating wall means separating said compartments and being responsive to pressure differentials therebetween to shift between two limit positions corresponding to said two opposite positions of the remote member; means including a first solenoid valve and a second solenoid valve connected with said first and second compartments respectively for selective actuation to cause preponderant pressure in the two compartments selectively for consequent shift of said actuating wall means between its two limit positions; a first solenoid circuit and a second solenoid circuit to energize two said solenoid valves respectively for operation thereof; master switch means to close said two circuits selectively; and two limit switches in said two circuits respectively, said limit switches being biased to seek their closed positions and being positioned to be opened in response to movement of said remote member to its opposite positions respectively.

References Cited in the file of this patent

UNITED STATES PATENTS

| | | |
|---|---|---|
| 533,817 | Keenan | Feb. 5, 1895 |
| 1,082,821 | Richards | Dec. 30, 1913 |
| 1,579,241 | Papashvili | Apr. 6, 1926 |
| 1,631,161 | Russell | June 7, 1927 |
| 2,058,996 | Kollberg | Oct. 27, 1936 |
| 2,616,449 | Maha | Nov. 4, 1952 |
| 2,654,564 | Pech | Oct. 6, 1953 |
| 2,662,547 | Comeau | Dec. 15, 1953 |
| 2,752,944 | Temple | July 3, 1956 |
| 2,758,835 | Wikkerink | Aug. 14, 1956 |
| 2,851,648 | Reger | Sept. 9, 1958 |
| 2,865,593 | Staiger | Dec. 23, 1958 |
| 2,934,312 | Stevens | Apr. 26, 1960 |

FOREIGN PATENTS

| | | |
|---|---|---|
| 438,322 | France | of 1912 |